US012750502B2

(12) United States Patent
Wu et al.

(10) Patent No.: US 12,750,502 B2
(45) **Date of Patent: *Sep. 29, 2026**

(54) IMAGE PROCESSING METHOD AND IMAGE PROCESSING DEVICE FOR ENHANCING IMAGE PROCESSING EFFICIENCY

(71) Applicant: Realtek Semiconductor Corp., HsinChu (TW)

(72) Inventors: Po-Hsien Wu, HsinChu (TW); Yi-Chen Tseng, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 499 days.

This patent is subject to a terminal disclaimer.

(21) Appl. No.: 18/135,195

(22) Filed: Apr. 17, 2023

(65) Prior Publication Data

US 2024/0048734 A1 Feb. 8, 2024

(30) Foreign Application Priority Data

Aug. 5, 2022 (TW) ................................. 111129510

(51) Int. Cl.
*H04N 7/12* (2006.01)
*H04N 9/77* (2006.01)
(Continued)

(52) U.S. Cl.
CPC ............. *H04N 19/186* (2014.11); *H04N 9/77* (2013.01); *H04N 19/172* (2014.11); *H04N 19/423* (2014.11)

(58) Field of Classification Search
CPC ...... H04N 19/186; H04N 9/77; H04N 19/172; H04N 19/423; H04N 1/646; H04N 19/176; H04N 19/44
See application file for complete search history.

(56) References Cited

U.S. PATENT DOCUMENTS 5,021,882 A * 6/1991 Schreiber ............... H04N 11/28 348/E7.024
5,892,522 A 4/1999 Moutin
(Continued)

FOREIGN PATENT DOCUMENTS

JP 7-7745 A 1/1995
TW 201812706 A 4/2018
(Continued)

OTHER PUBLICATIONS

Tseng, the specification, including the claims, and drawings in the U.S. Appl. No. 18/135,192, filed Apr. 17, 2023.

*Primary Examiner* — Gims S Philippe
(74) *Attorney, Agent, or Firm* — Winston Hsu

(57) ABSTRACT

An image processing method includes receiving an image frame, retrieving luminance information and chrominance information from the image frame, respectively, encoding the luminance information to generate an encoded luminance frame, encoding the chrominance information to generate an encoded chrominance frame, writing the encoded luminance frame to a first memory portion of a memory, and writing the encoded chrominance frame to a second memory portion of the memory. The image processing method further includes reading the encoded luminance frame from the first memory portion and decoding the encoded luminance frame to generate decoded luminance information, and reading the encoded chrominance frame from the second memory portion and decoding the encoded chrominance frame to generate decoded chrominance information.

9 Claims, 8 Drawing Sheets

(51) Int. Cl.

| | |
|---|---|
| ***H04N 19/172*** | (2014.01) |
| ***H04N 19/186*** | (2014.01) |
| ***H04N 19/423*** | (2014.01) |

(56) References Cited

U.S. PATENT DOCUMENTS

| | | | | |
|---|---|---|---|---|
| 5,920,352 | A | 7/1999 | Inoue | |
| 11,006,125 | B2 * | 5/2021 | Minezawa | H04N 19/11 |
| 12,363,330 | B2 * | 7/2025 | Tseng | H04N 19/186 |
| 2006/0023954 | A1 * | 2/2006 | Ishizuka | H04N 19/33<br>375/E7.185 |
| 2006/0256232 | A1 * | 11/2006 | Noguchi | H04N 19/61<br>375/E7.185 |
| 2011/0102447 | A1 | 5/2011 | Lin | |
| 2013/0077694 | A1 * | 3/2013 | Terada | H04N 19/122<br>375/240.18 |
| 2017/0070740 | A1 * | 3/2017 | Lawrence | H04N 19/146 |
| 2017/0180741 | A1 * | 6/2017 | Ross | H04N 19/44 |
| 2018/0075304 | A1 | 3/2018 | Li | |
| 2020/0296367 | A1 * | 9/2020 | Pham Van | H04N 19/186 |
| 2020/0334864 | A1 | 10/2020 | Liu | |
| 2022/0224891 | A1 | 7/2022 | Chiang | |
| 2022/0386759 | A1 | 12/2022 | Fu | |
| 2023/0101318 | A1 * | 3/2023 | Kotra | H04N 19/14<br>375/240.29 |

FOREIGN PATENT DOCUMENTS

| | | | |
|---|---|---|---|
| TW | 201931179 | A | 8/2019 |
| TW | 202041019 | A | 11/2020 |
| TW | 202042557 | A | 11/2020 |

* cited by examiner

IMAGE PROCESSING METHOD AND IMAGE PROCESSING DEVICE FOR ENHANCING IMAGE PROCESSING EFFICIENCY

BACKGROUND OF THE INVENTION

1. Field of the Invention

The present invention relates to image processing, and in particular, to an image processing method and an image processing device for enhancing the efficiency of image processing.

2. Description of the Prior Art

A display device is a device for displaying image data. Image data may be stored in a variety of formats. The YUV format is a format in which each pixel is represented by a luma component and a chroma component. When transmitting images in an NV12 format of the YUV format, the luma components of all pixels will be transmitted first, and the chroma components of all pixels will be transmitted next. In motion joint photographic experts group (MJPEG)-based or moving picture experts group (MPEG)-based related art, the luma and chroma components of all pixels are encoded in one compressed file. Due to the limited memory space in the video decoder, when the luma component of all pixels are required to be transmitted, the video decoder would decode the compressed file to generate the luma component of all pixels, and when the chroma components of all pixels are required to be transmitted, the video decoder would decode the compressed file for the second time to generate the chroma components of all pixels. As a consequence, a conventional image decoder capable of generating 60 frames per second for a single decoding process can only process 30 frames per second for the double decoding process, reducing the efficiency considerably.

Further, since the chroma components of all pixels must be decoded before releasing the memory, the memory space must be sufficiently large to hold at least 2 compressed files of images, half of the memory space being used to buffer the compressed files being decoded, and the other half of the memory space being used to buffer the newly written compressed file, increasing the required memory space significantly.

SUMMARY OF THE INVENTION

According to an embodiment of the invention, an image processing method includes receiving an image frame, retrieving luminance information and chrominance information from the image frame, respectively, encoding the luminance information to generate an encoded luminance frame, encoding the chrominance information to generate an encoded chrominance frame, writing the encoded luminance frame into a first memory portion of a memory, and writing the encoded chrominance frame into a second memory portion of the memory. The method further includes reading the encoded luminance frame from the first memory portion, and decoding the encoded luminance frame to generate decoded luminance information, and reading the encoded chrominance frame from the second memory portion, and decoding the encoded chrominance frame to generate decoded chrominance information.

According to another embodiment of the invention, an image processing method includes receiving an image frame, retrieving only luminance information from the image frame, encoding the luminance information to generate an encoded luminance frame, writing the encoded luminance frame into a memory, and reading the encoded luminance frame from the memory, and decoding the encoded luminance frame to generate decoded luminance information.

According to another embodiment of the invention, an image processing method includes receiving an image frame, retrieving only chrominance information from the image frame, encoding the chrominance information to generate an encoded chrominance frame, writing the encoded chrominance frame into a memory, and reading the encoded chrominance frame from the memory, and decoding the encoded chrominance frame to generate decoded chrominance information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
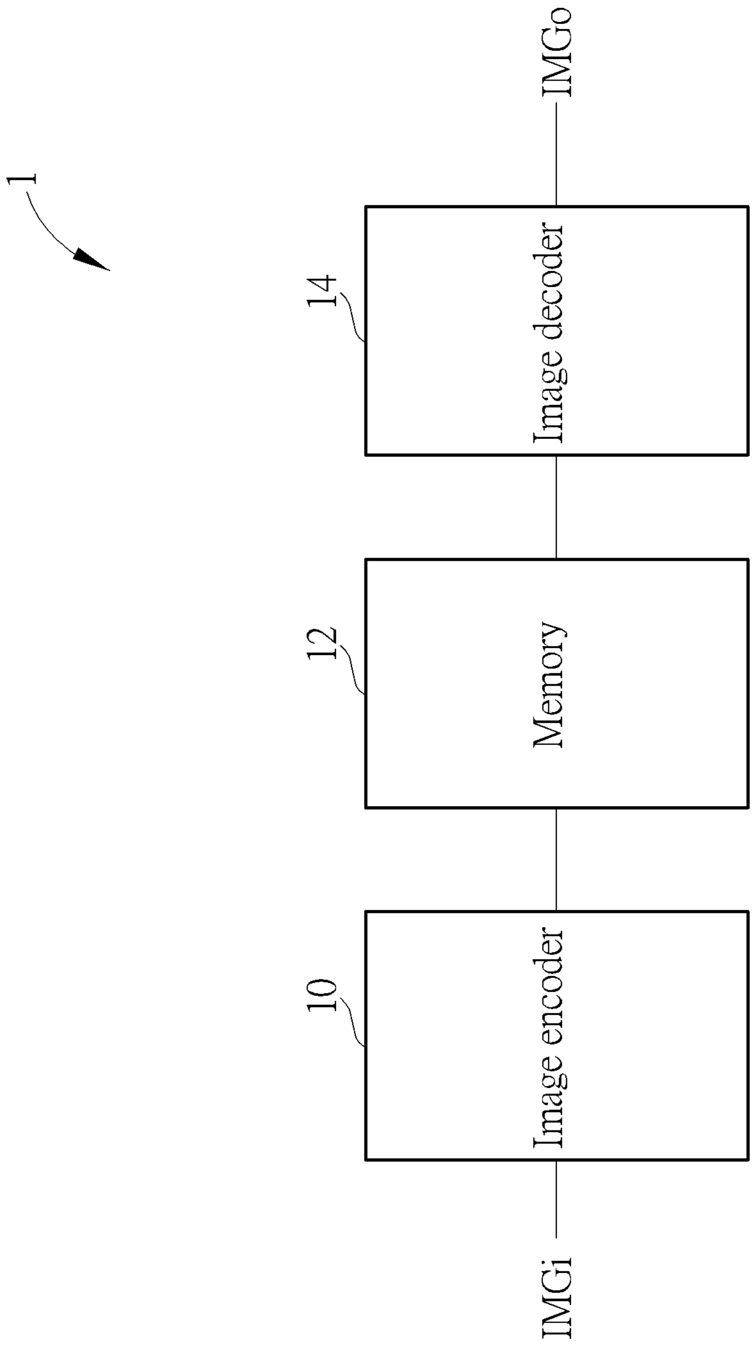
FIG. 1 is a block diagram of an image processing device according to an embodiment of the invention.

FIG. 1 is a block diagram of an image processing device 1 according to an embodiment of the invention. The image processing device 1 may convert a frame rate of an input frame IMGi to transmit an output frame IMGo in various formats to a display device or a processor. The display device may be a television, a computer screen, a tablet computer, a smart phone or other display devices. The processor may be a graphics processor, a central processing unit, or other types of processors. The image processing device 1 may support the universal serial bus video class (UVC) standard to transmit the output frame IMGo. The input frame IMGi and the output frame IMGo may be still images or video images, and may be YUV frames such as YUV420 frames including luminance information and chrominance information. The formats, frame rates and resolutions of the input frame IMGi and the output frame IMGo may be the same or different. For example, the input frame IMGi may adopt the NV12 format, a frame rate of 30 frames per second (fps), and the 4K ultra-high-definition (UHD) resolution, and the output frame IMGo may adopt the NV12 format, a frame rate of 60 fps, and the 4K UHD resolution.

When the output frame IMGo is transmitted in a planar format such as the NV12 format, the image processing device 1 needs to transmit all the luminance information in the output frame IMGo before transmitting the chrominance information in the output frame IMGo. In the embodiment, the image processing device 1 may encode the luminance information and the chrominance information in the input frame IMGi, respectively. When the luminance information is to be transmitted, only the encoded luminance information will be decoded and transmitted, and when the chrominance information is to be transmitted, only the encoded chrominance information will be decoded and transmitted, thereby reducing the number of times of decoding, reducing the required computing power, and enhancing the efficiency of image processing.

The image processing device 1 may include an image encoder 10, a memory 12 and an image decoder 14. The memory 12 is coupled to the image encoder 10, and the image decoder 14 is coupled to the memory 12. The image encoder 10 and the image decoder 14 may support the motion joint photographic experts group (MJPEG) standard, the moving picture experts group (MPEG) standard, or other image compression standards.

The image encoder 10 may receive the input frame IMGi from a video source such as a TV tuner card, a camera, a video recorder, an image storage medium, or other digital image sources. The input frame IMGi may include a plurality of pieces of luminance information and a plurality of pieces of chrominance information, the luminance information may be the luma component of each pixel in the input frame IMGi, and the chrominance information may be the chroma component of each pixel in the input frame IMGi. The image encoder 10 may respectively retrieve the luminance information and the chrominance information from the input frame IMGi, encode the luminance information to generate an encoded luminance frame, encode the chrominance information to generate an encoded chrominance frame, and separately store the encoded luminance frame and the encoded chrominance frame in the memory 12.

The memory 12 may include a first memory portion and a second memory portion, the first memory portion may store the encoded luminance frame, and the second memory portion may store the encoded chrominance frame. The memory 12 may be a frame buffer having sufficient space to store both the encoded luminance frame and the encoded chrominance frame. The space of the second memory portion may be less than that of the first memory portion.

When the output frame IMGo is transmitted in the NV12 format, the image decoder 14 may read the encoded luminance frame from the first memory portion of the memory 12, and decode the encoded luminance frame to generate a plurality of pieces of decoded luminance information, and transmit the plurality of pieces of decoded luminance information to the display device via a UVC driver. After transmitting the decoded luminance information, the image decoder 14 may read the encoded chrominance frame from the second memory portion of the memory 12, and decode the encoded chrominance frame to generate a plurality of pieces of decoded chrominance information, and transmit the plurality of pieces of decoded chrominance information to the display device via the UVC driver. The plurality of pieces of decoded luminance information and the plurality of pieces of decoded chrominance information may form an output frame IMGo. In some embodiments, while the image decoder 14 is decoding the encoded luminance frame, the first memory portion of the memory 12 may be released for the image encoder 10 to write the next encoded luminance frame into the first memory portion of the memory 12. While the image decoder 14 is decoding the encoded chrominance frame, the second memory portion of the memory 12 may be released for the image encoder 10 to write the next encoded chrominance frame into the second memory portion of the memory 12.

The luminance information in the input frame IMGi and the decoded luminance information in the output frame IMGo may use the same or different frame rates. The chrominance information in the input frame IMGi and the decoded chrominance information in the output frame IMGo may use the same or different frame rates. The luminance information and the chrominance information in the input frame IMGi should use the same frame rate, and the decoded luminance information and the decoded chrominance information in the output frame IMGo should use the same frame rate. For example, the frame rate of the luminance information and the frame rate of the chrominance information in the input frame IMGi may be 30 fps, the frame rate of the luminance information and the frame rate of the chrominance information in the output frame IMGo may be 60 fps.

The luminance information in the input frame IMGi and the decoded luminance information in the output frame IMGo may use the same or different resolutions. The chrominance information in the input frame IMGi and the decoded chrominance information in the output frame IMGo may use the same or different resolutions. The luminance information and the chrominance information in the input frame IMGi may have different resolutions, and the decoded luminance information and the decoded chrominance information in the output frame IMGo may have different resolutions. For example, the resolution of the luminance information in the input frame IMGi may be 4K UHD, the resolution of the chrominance information in the input frame IMGi in the input frame IMGi may be 1080p high definition (HD), the resolution of the luminance information in the output frame IMGo may be 4K UHD, and the frame rate of the chrominance information in the output frame IMGo may be 1080p HD.

In some embodiments, the image processing device 1 may implement luminance processing functions such as sharpness enhancement or local dimming for a display device. When performing sharpness enhancement, the processor may enhance the contrast of all luminance data in the output frame IMGo. When performing local dimming, the display device may separately drive the backlight modules of the display device according to different regions, thereby enhancing the contrast of the display device and achieving ultra-high image quality. For the luminance processing applications, the image processing device 1 only needs to transmit luminance information without transmitting chrominance information to the display device. The image encoder 10 may only retrieve the luminance information from the input frame IMGi, encode the luminance information to generate an encoded luminance frame, and store the encoded luminance frame in the memory 12. Compared to the application of transmitting NV12 frames, since the memory 12 only needs to store the encoded luminance frames, the required space of the memory 12 may be equal to the size of the encoded luminance frames, further saving the memory space, reducing the decoding period, reducing the required computational power, and enhancing image processing efficiency. When the luminance information are required to be transmitted, the image decoder 14 may read the encoded luminance frame from the memory 12, decode the encoded luminance frame to generate a plurality of pieces of decoded luminance information, and transmit the plurality of pieces of decoded luminance information to the display device to provide luminance processing functions.

In other embodiments, the image processing device 1 may implement chrominance processing functions such as color correction or saturation correction for a display device. For chrominance processing applications, the image processing device 1 only needs to transmit chrominance information without transmitting luminance information to the display device. The image encoder 10 may only retrieve the chrominance information from the input frame IMGi, encode the chrominance information to generate an encoded chrominance frame, and store the encoded chrominance frame in the memory 12. Compared to the application of transmitting NV12 frames, since the memory 12 only needs to store the encoded chrominance frames, the required space of the memory 12 may be equal to the size of the encoded required frames, further saving the memory space, reducing the decoding period, reducing the required computational power, and enhancing the efficiency of image processing. When the chrominance information are required to be transmitted, the image decoder 14 may read the encoded chrominance frame from the memory 12, decode the encoded chrominance frame to generate a plurality of pieces of decoded chrominance information, and transmit the plurality of pieces of decoded chrominance information to the display device to provide chrominance processing functions.

While FIG. 1 is explained with reference to the transmission of NV12 frames according to the UVC standard, the image processing device 1 may also adopt other communication standards to transmit frames of other formats, such as YUY2 frames or RGB444 frames. Moreover, while the preceding paragraphs only explain the method of processing a single input frame IMGi, those skilled in the art may recognize that the method may be adapted to sequentially and separately process the luminance information and chrominance information of a plurality of input frames IMGi without deviating from the principle of the present invention, and to transmit all the luminance information first and then all the chrominance information to sequentially transmit each output frame IMGo.

Figure 2:
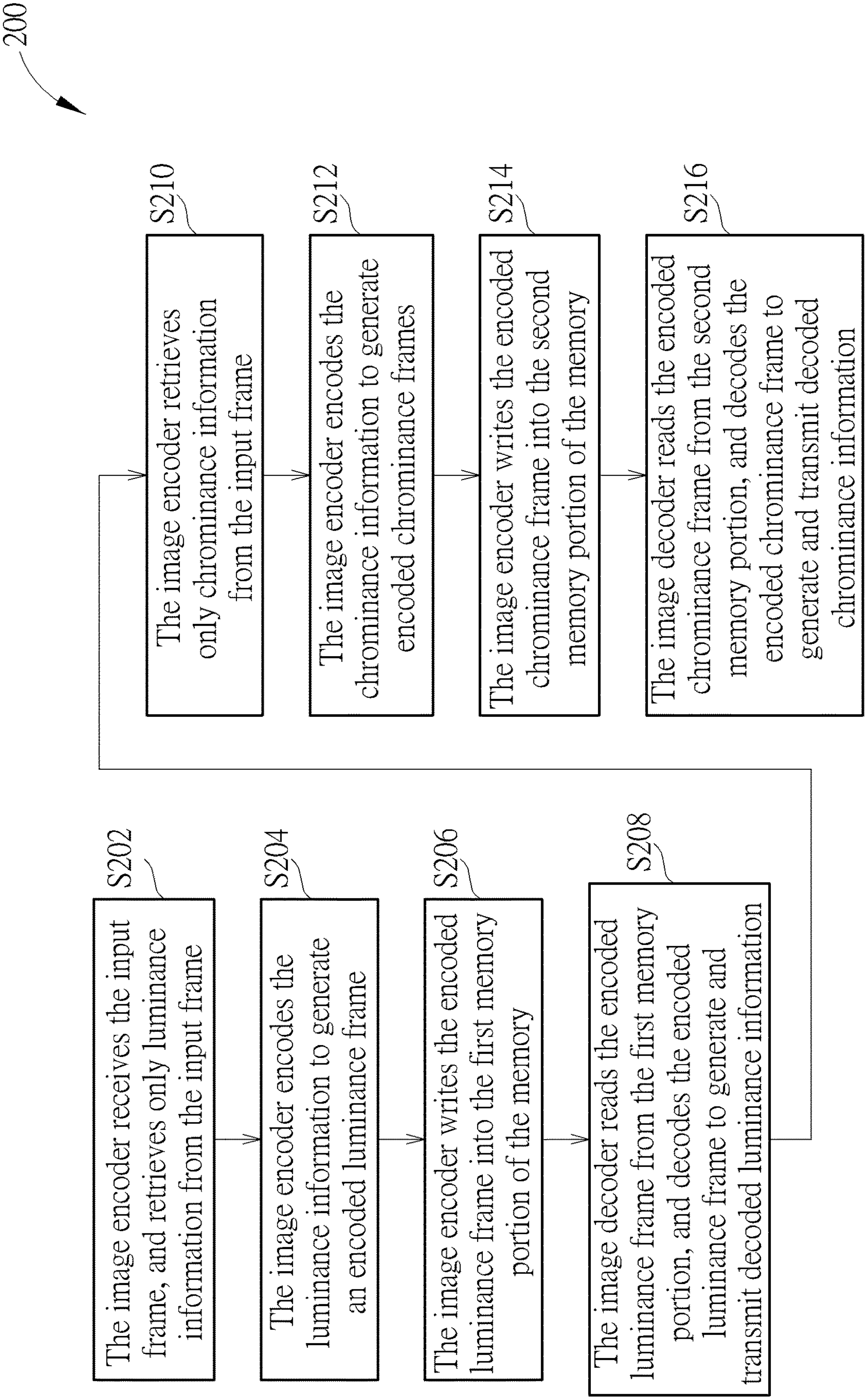
FIG. 2 is a flowchart of an image processing method of the image processing device in FIG. 1.

FIG. 2 is a flowchart of an image processing method of the image processing device FIG. 1. The image processing method 200 includes Steps S202 to S216, wherein Steps S202 to S208 are used to process and transmit luminance information, and Steps S210 to S216 are used to process and transmit chrominance information. Any reasonable step change or adjustment is within the scope of the present disclosure. Steps S202 to S216 are detailed as follows:

Step S202: The image encoder 10 receives the input frame IMGi, and retrieves only luminance information from the input frame IMGi;

Step S204: The image encoder 10 encodes the luminance information to generate an encoded luminance frame;

Step S206: The image encoder 10 writes the encoded luminance frame into the first memory portion of the memory 12;

Step S208: The image decoder 14 reads the encoded luminance frame from the first memory portion, and decodes the encoded luminance frame to generate and transmit decoded luminance information;

Step S210: The image encoder 10 retrieves only chrominance information from the input frame IMGi;

Step S212: The image encoder 10 encodes the chrominance information to generate encoded chrominance frames;

Step S214: The image encoder 10 writes the encoded chrominance frame into the second memory portion of the memory 12;

Step S216: The image decoder 14 reads the encoded chrominance frame from the second memory portion, and decodes the encoded chrominance frame to generate and transmit decoded chrominance information.

Figure 3A:
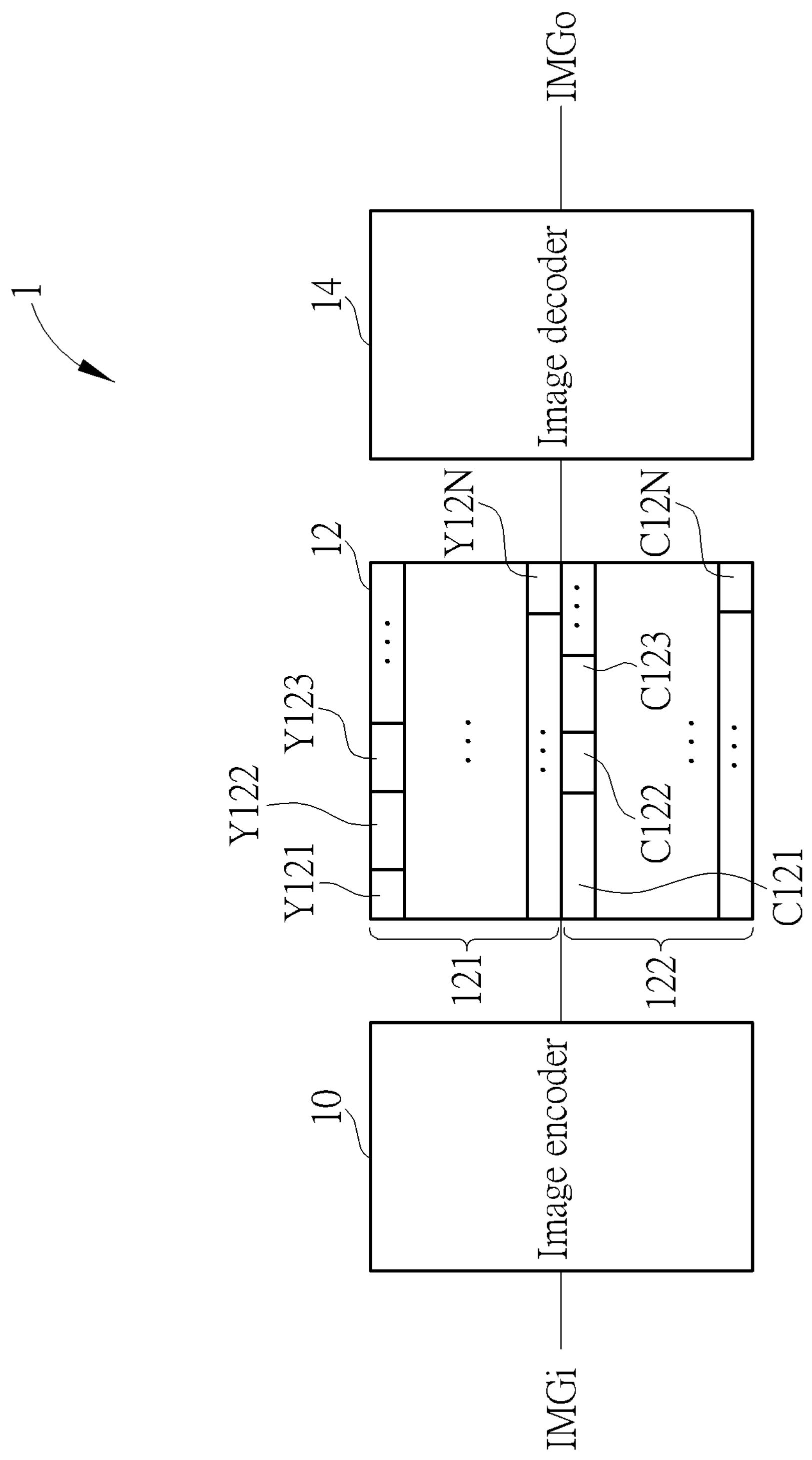
FIG. 3A is a schematic diagram of transmitting YUV frames by the image processing device in FIG. 1.

Steps S202 to S216 may be used to transmit YUV frames such as YUV frames in NV12 format. In some embodiments, Steps S210 to S214 may be performed before Step S208, and then Step S216 is performed after Step S208 is completed. FIG. 3A is a schematic diagram of the image processing device 1 transmitting YUV frames. In FIG. 3A, the memory 12 includes a first memory portion 121 and a second memory portion 122. Steps S202 to S216 are explained below with reference to FIG. 3A.

When transmitting the luminance information in the YUV frame, the image encoder 10 retrieves only the luminance information from the input frame IMGi (Step S202), and encodes the luminance information according to a predetermined coding block size to generate encoded luminance information Y121 to Y12N, N may be a positive integer greater than 1 (Step S204). The predetermined encoding block size may be 16×16. The encoded luminance information Y121 to Y12N may form an encoded luminance frame, and the sizes of the encoded luminance information Y121 to Y12N may be the equal to or different from each other. Next, the image encoder 10 writes the encoded luminance information Y121 to Y12N into the first memory portion 121 of the memory 12 (Step S206), the image decoder 14 reads and decodes the encoded luminance information Y121 to Y12N from the first memory portion 121, and the UVC driver transmits the decoded luminance information to the display device (Step S208).

When transmitting the chrominance information in the YUV frame, the image encoder 10 retrieves only the chrominance information from the input frame IMGi (Step S210), and encodes the chrominance information according to a predetermined coding block size to generate encoded chrominance information C121 to C12N (Step S212). The predetermined encoding block size may be 8×8. The encoded chrominance information C121 to C12N may form an encoded chrominance frame, and the sizes of the encoded chrominance information C121 to C12N may be the equal to or different from each other. Next, the image encoder 10 writes the encoded chrominance information C121 to C12N into the second memory portion 122 of the memory 12 (Step S214), the image decoder 14 reads and decodes the encoded chrominance information C121 to C12N from the second memory portion 122, and the UVC driver transmits the decoded chrominance information to the display device (Step S216).

Figure 3B:
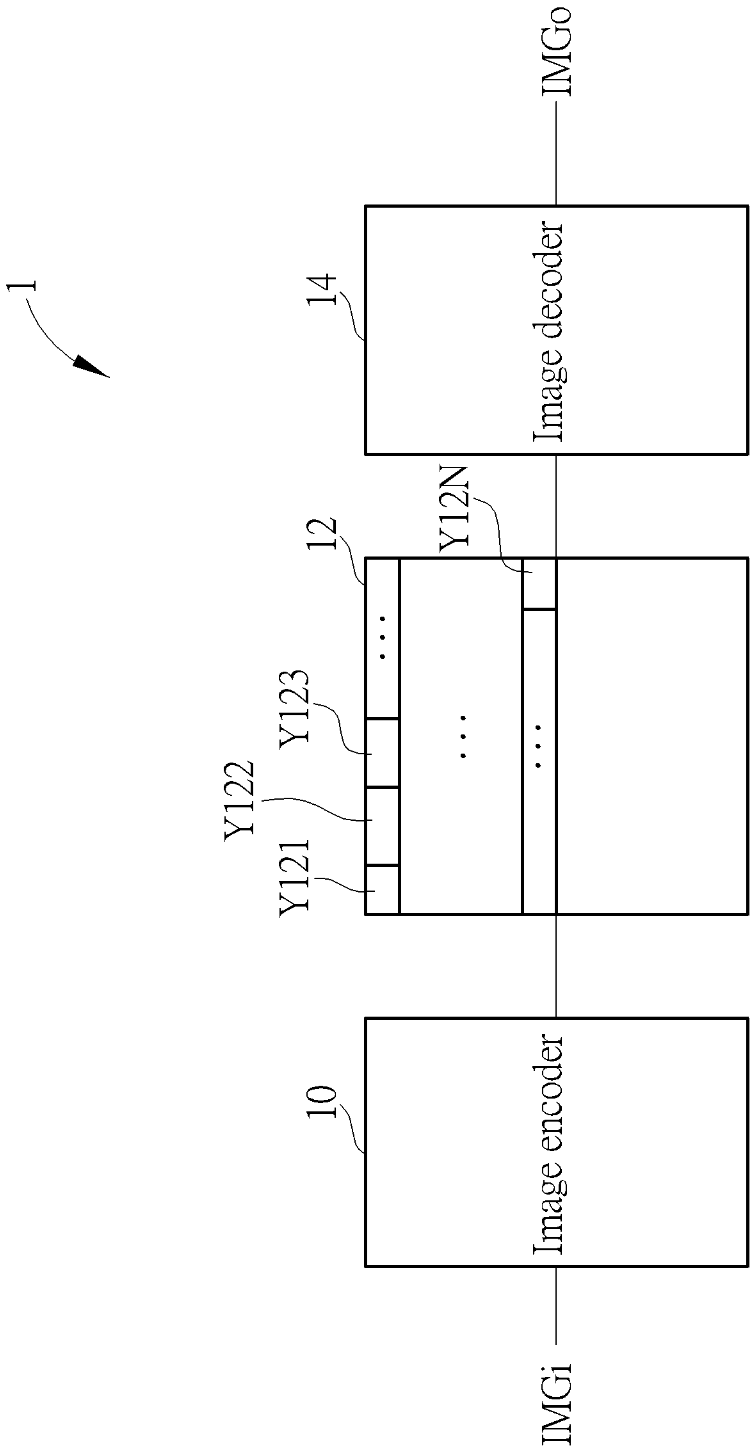
FIG. 3B is a schematic diagram of luminance processing performed by the image processing device in FIG. 1.

For the luminance processing applications, the image processing device 1 may only execute Steps S202 to S208 without executing Steps S210 to S216, and write the encoded luminance frame into the memory 12 in Step S206. FIG. 3B is a schematic diagram of the image processing device 1 performing luminance processing. Steps S202 to S208 are explained below with reference to the image processing device 1 performing luminance processing in FIG. 3B.

The image encoder 10 retrieves only the luminance information from the input frame IMGi (Step S202), and encodes the luminance information according to a predetermined coding block size to generate the encoded luminance information Y121 to Y12N, N being a positive integer greater than 1 (Step S204). The predetermined encoding block size may be 16×16. The encoded luminance information Y121 to Y12N may form an encoded luminance frame, and the sizes of the encoded luminance information Y121 to Y12N may be the equal to or different from each other. Next, the image encoder 10 writes the encoded luminance information Y121 to Y12N into the memory 12 (Step S206), the image decoder 14 reads and decodes the encoded luminance information Y121 to Y12N from memory 12, and transmits the decoded luminance information to the processor or the display device (Step S208). The processor or the display device then performs luminance processing such as sharpness processing or regional dimming according to the decoded luminance information. For the luminance processing applications, the image processing device 1 does not need to process and store the chrominance information from the input frame IMGi, saving the memory space, reducing the decoding period, reducing the required computing power, and enhancing the efficiency of image processing.

Figure 3C:
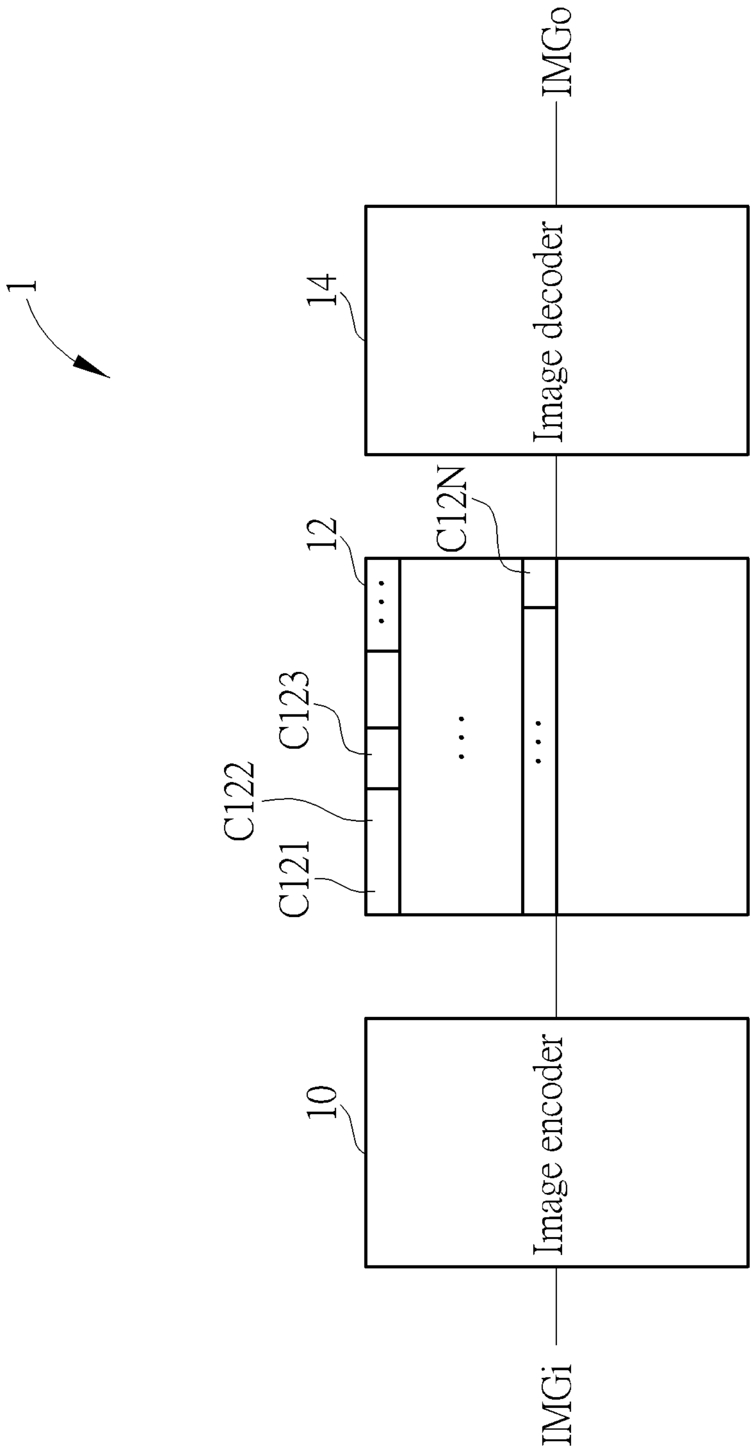
FIG. 3C is a schematic diagram of chrominance processing performed by the image processing device in FIG. 1.

For the chrominance processing applications, the image processing device 1 may only execute Steps S210 to S216 without executing Steps S202 to S208, and write the encoded chrominance frame into the memory 12 in Step S214. FIG. 3C is a schematic diagram of the image processing device 1 performing chrominance processing. Steps S210 to S216 are explained below with reference to the image processing device 1 performing chrominance processing in FIG. 3C.

The image encoder 10 retrieves only the chrominance information from the input frame IMGi (Step S210), and encodes the chrominance information according to a predetermined coding block size to generate the encoded chrominance information C121 to C12N, N being a positive integer greater than 1 (Step S212). The predetermined encoding block size may be 8×8. The encoded chrominance information C121 to C12N may form an encoded chrominance frame, and the sizes of the encoded chrominance information C121 to C12N may be the equal or different from each other. Next, the image encoder 10 writes the encoded chrominance information C121 to C12N into the memory 12 (Step S214), the image decoder 14 reads and decodes the encoded chrominance information C121 to C12N from memory 12, and transmits the decoded chrominance information to the processor or the display device (Step S216). The processor or the display device then performs chrominance processing such as color correction or saturation correction according to the decoded chrominance information. For the chrominance processing applications, the image processing device 1 does not need to process and store the luminance information from the input frame IMGi, saving the memory space, reducing the decoding period, reducing the required computational power, and enhancing the efficiency of image processing.

In the embodiments in FIGS. 1, 2, 3A to 3C, the image processing device 1 may encode the luminance information and the chrominance information in the input frame IMGi, respectively. When the luminance information of the output frame is to be transmitted, only the encoded luminance information is decoded and transmitted, and when the chrominance information of the output frame is to be transmitted, only the encoded chrominance information is decoded and transmitted, thereby reducing the number of times of decoding, reducing the required computing power, and enhancing the efficiency of image processing.

Figure 4:
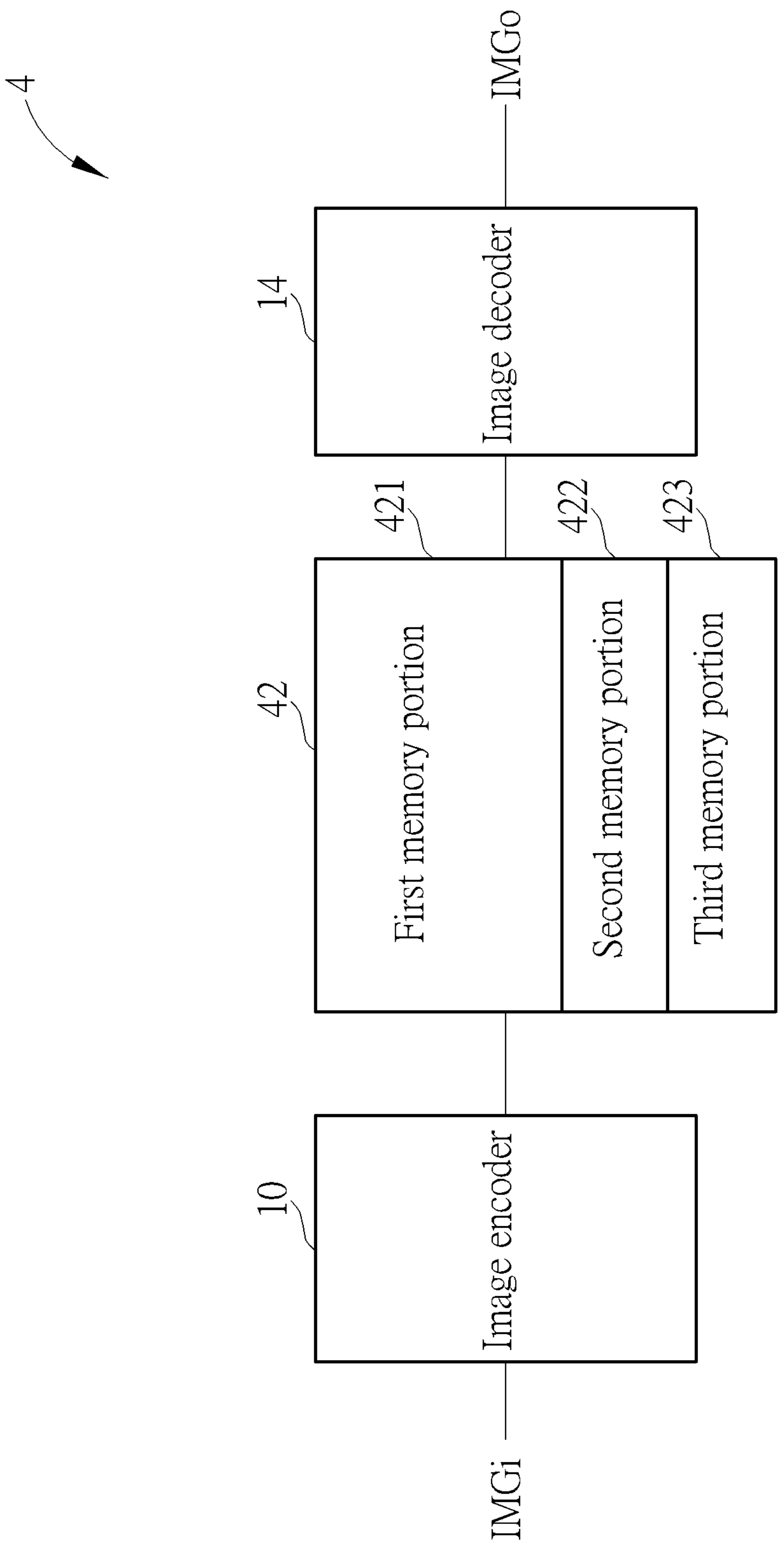
FIG. 4 is a block diagram of an image processing device according to another embodiment of the invention.

FIG. 4 is a block diagram of an image processing device 4 according to another embodiment of the invention. The image processing device 4 is similar to the image processing device 1, and the main difference lies in the space management and access methods of the memory 42. The difference between the image processing device 4 and the image processing device 1 will be explained as follows.

The memory 42 may include a first memory portion 421, a second memory portion 422 and a third memory portion 423. The first memory portion 421 may store the encoded luminance frames, and the second memory portion 422 and the third memory portion 423 may store the encoded chrominance frames in turn. Since the data volume of the chrominance information of the YUV420 frame is ½ of the data volume of the luminance information, and the compression rate of the chrominance information may be greater than the compression rate of the luminance information, the memory size of the first memory portion 421 may exceed that of the second memory portion 422, and the memory size of the first memory portion 421 may exceed the memory size of the third memory portion 423. The memory size of the second memory portion 422 may be equal to the memory size of the third memory portion 423. In some embodiments, the memory size of the second memory portion 422 and the memory size of the third memory portion 423 may both be ⅛ of the memory size of the first memory portion 421, further saving the memory space of the memory 42.

After encoding, the image encoder 10 may repeatedly store the encoded luminance frames of the input frames IMGi to the first memory portion 421, and store the encoded chrominance frames of the input frames IMGi in the second memory portion 422 and the third memory portion 423 in turn. Accordingly, when decoding, the image decoder 14 may repeatedly read the encoded luminance frames of the plurality of input frames IMGi from the first memory portion 421, and alternately read the encoded chrominance frames of the plurality of input frames IMGi from the second memory portion 422 and the third memory portion 423.

5A and 5B are flowcharts of an image processing method 500 adopted by the image processing device 4. The image processing method 500 includes Steps S502 to S526, wherein Steps S502 to S516 are used to separately processing the first decoded luminance information and the first decoded chrominance information of the first output frame IMGo, and Steps S518 to S526 are used to separately processing the second decoded luminance information and the second decoded chrominance information of the second output frame IMGo. Any reasonable step change or adjustment is within the scope of the present disclosure. Steps S502 to S526 are detailed as follows:

Step S502: The image encoder 10 receives the first input frame IMGi, and retrieves the first luminance information and the first chrominance information from the first input frame IMGi, respectively;

Step S504: The image encoder 10 encodes the first luminance information to generate a first encoded luminance frame, and encodes the first chrominance information to generate a first encoded chrominance frame;

Step S506: The image encoder 10 writes the first encoded luminance frame into the first memory portion 421, and writes the first encoded chrominance frame into the second memory portion 422;

Step S508: The image decoder 14 reads the first encoded luminance frame from the first memory portion 421 to decode the frame;

Step S510: When the image decoder 14 decodes the first encoded luminance frame, the image encoder 10 receives the second input frame IMGi, and retrieves the second luminance information and the second chrominance information from the second input frame IMGi, respectively;

Step S512: The image encoder 10 encodes the second luminance information to generate a second encoded luminance frame, and encodes the second chrominance information to generate a second encoded chrominance frame;

Step S514: The image encoder 10 writes the second encoded luminance frame into the first memory portion 421, and writes the second encoded chrominance frame into the third memory portion 423;

Step S516: Upon completion of decoding the first encoded luminance frame, the image decoder 14 reads the first encoded chrominance frame from the second memory portion 422 to decode the frame;

Step S518: The image decoder 14 reads the second encoded luminance frame from the first memory portion 421 to decode the frame;

Step S520: When the image decoder 14 decodes the second encoded luminance frame, the image encoder 10 receives the third input frame IMGi, and retrieves third luminance information and third chrominance information from the third input frame IMGi, respectively;

Step S522: The image encoder 10 encodes the third luminance information to generate a third encoded luminance frame, and encodes the third chrominance information to generate a third encoded chrominance frame;

Step S524: The image encoder 10 writes the third encoded luminance frame into the first memory portion 421, and writes the third encoded chrominance frame into the second memory portion 422;

Step S526: Upon completion of decoding the second encoded luminance frame, the video decoder 14 reads the second encoded chrominance frame from the third memory portion 423 to decode the frame.

The image processing method 500 is explained below with reference to the image processing device 4. In Step S506, since the first memory portion 421, the second memory portion 422, and the third memory portion 423 all contain no data, the image encoder 10 writes the first encoded luminance frame into the first memory portion 421, and writing the first encoded chrominance frame into the second memory portion 422. In Step S508, the image decoder 14 reads the first encoded luminance frame from the first memory portion 421, and decodes the first encoded luminance frame to generate and transmit the first decoded luminance information. Since the first encoded luminance frame has been read but the first encoded chrominance frame has not been read, the space of the first memory portion 421 is released, and the space of the second memory portion 422 is still occupied by the first encoded chrominance frame. Therefore, in Steps S510 to S514, when the image decoder 14 decodes the first encoded luminance frame, the image encoder 10 continues to receive the second input frame IMGi, separately encodes the second luminance information and the second chrominance information to generate the second encoded luminance frame and the second encoded chrominance frame, writes the second encoded luminance frame into the first memory portion 421, and writes the second encoded chrominance frame into the third memory portion 423. When Step S508 is executed, Steps S510 to S514 are sequentially performed. In Step S516, decoding of the first encoded luminance frame is completed, the image decoder 14 reads the first encoded chrominance frame from the second memory portion 422, and decodes the first encoded chrominance frame to generate and transmit the second decoded chrominance information, so as to complete the transmission of the first output frame IMGo. Since the first encoded chrominance frame has been read but the second encoded luminance frame and the second encoded chrominance frame have not been read, the space of the second memory portion 422 may be released, the space of the first portion 421 is still occupied by the second encoded luminance frame, and the space of the third memory portion 423 is still occupied by the second encoded chrominance frame.

In Step S518, the image decoder 14 reads the second encoded luminance frame from the first memory portion 421, and decodes the second encoded luminance frame to generate and transmit the second decoded luminance information. Since the second encoded luminance frame has been read but the second encoded chrominance frame has not been read, the space of the first memory portion 421 may be released, and the space of the third memory portion 423 is still occupied by the second encoded chrominance frame. Therefore, in Steps S520 to S524, when the image decoder 14 decodes the second encoded luminance frame, the image encoder 10 continues to receive the third input frame IMGi, separately encodes the third luminance information and the third chrominance information to generate the third encoded luminance frame and the third encoded chrominance frame, writes the third encoded luminance frame into the first memory portion 421, and writes the third encoded luminance frame into the second memory portion 422. When Step S518 is executed, Steps S520 to S524 are sequentially performed. In Step S526, decoding of the second encoded luminance frame is completed, the image decoder 14 reads the second encoded chrominance frame from the third memory portion 423, and decodes the second encoded chrominance frame to generate and transmit the second decoded chrominance information, so as to complete the transmission of the second output frame IMGo. Since the second encoded chrominance frame has been read but the third encoded luminance frame and the third encoded chrominance frame have not been read, the space of the third memory portion 423 may be released, the space of the first portion 421 is still occupied by the third encoded luminance frame, and the space of the second memory portion 422 is still occupied by the third encoded chrominance frame.

When processing a plurality of input frames IMGi, Steps S508 to S516 and Steps S518 to S526 may be performed alternately, so as to reuse the first memory portion 421 to store the encoded luminance frames of the input frames IMGi, and to use the second memory portion 422 and the third memory portion 423 alternately to store the encoded chrominance frames of the input frames IMGi, saving the memory space of the memory 42.

Figure 5A:
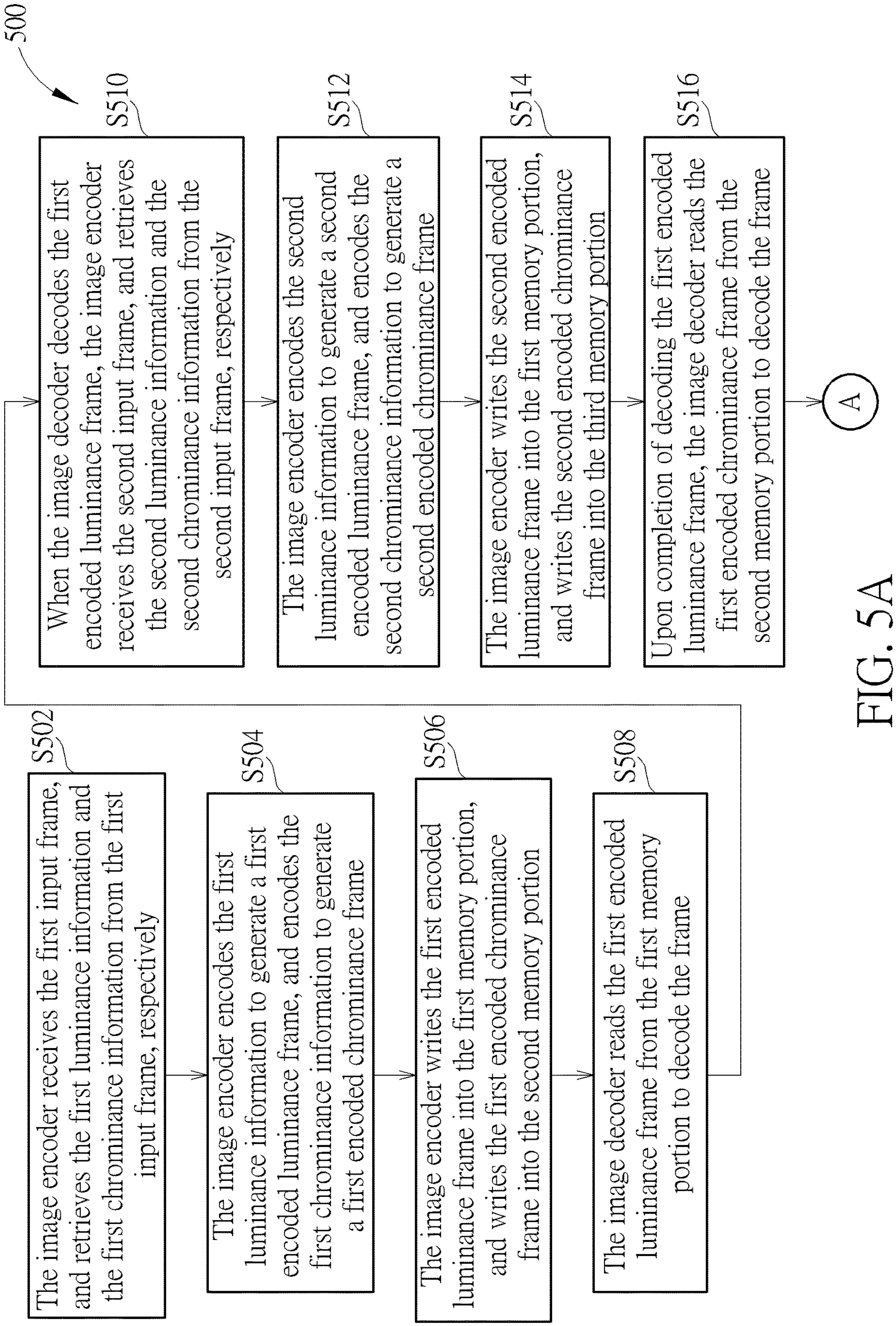
FIGS. 5A and 5B are flowcharts of image processing methods adopted by the image processing device in FIG. 4.
Figure 5B:
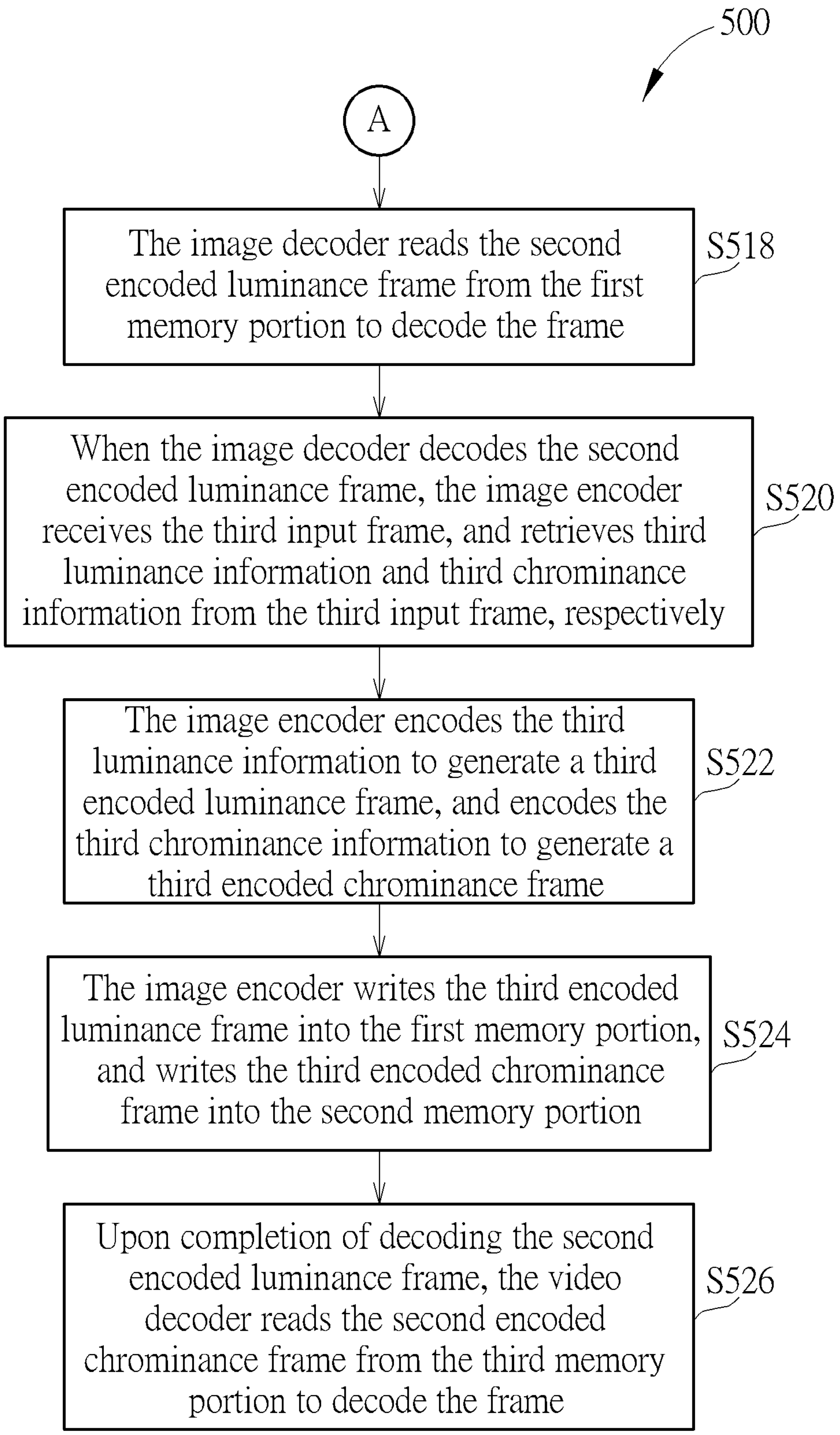

The embodiments of FIG. 4 and FIGS. 5A and 5B are used to encode the luminance information and chrominance information from the input frame IMGi, respectively, store the encoded luminance frames of the plurality of input frames IMGi in the first memory portion 421, and alternately store the encoded chrominance frames of the input frames IMGi in the second memory portion 422 and the third memory portion 423, saving the memory space, reducing the number of times of decoding, reducing the required computing power, and enhancing the efficiency of image processing.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method comprising:

receiving an image frame;

retrieving all luminance information and all chrominance information from the image frame;

encoding all and only the luminance information according to a first predetermined coding block size to generate an encoded luminance frame;

encoding all and only the chrominance information according to a second predetermined coding block size to generate an encoded chrominance frame;

writing the encoded luminance frame into a first memory portion of a memory;

writing the encoded chrominance frame into a second memory portion of the memory;

reading the encoded luminance frame from the first memory portion, and decoding the encoded luminance frame to generate decoded luminance information; and reading the encoded chrominance frame from the second memory portion, and decoding the encoded chrominance frame to generate decoded chrominance information.

2. The method of claim 1, wherein the luminance information from the image frame and the decoded luminance information have different frame rates.

3. The method of claim 1, wherein the chrominance information from the image frame and the decoded chrominance information have different frame rates.

4. The method of claim 1, wherein the chrominance information from the image frame and the decoded chrominance information have different resolutions.

5. An image processing method comprising:

receiving an image frame;

retrieving only luminance information from the image frame;

encoding all and only the luminance information according to a predetermined coding block size to generate an encoded luminance frame;

writing the encoded luminance frame into a dedicated portion of a memory; and reading the encoded luminance frame from the dedicated portion of the memory, and decoding the encoded luminance frame to generate decoded luminance information.

6. The method of claim 5, wherein the luminance information from the image frame and the decoded luminance information have different frame rates.

7. An image processing method comprising:

receiving an image frame;

retrieving only chrominance information from the image frame;

encoding all and only the chrominance information according to a predetermined coding block size to generate an encoded chrominance frame;

writing the encoded chrominance frame into a dedicated portion of a memory; and reading the encoded chrominance frame from the dedicated portion of the memory, and decoding the encoded chrominance frame to generate decoded chrominance information.

8. The method of claim 7, wherein the chrominance information from the image frame and the decoded chrominance information have different frame rates.

9. The method of claim 7, wherein the chrominance information from the image frame and the decoded chrominance information have different resolutions.

* * * * *